United States Patent
Goris et al.

(10) Patent No.: US 7,027,728 B2
(45) Date of Patent: Apr. 11, 2006

(54) CAMERA WITH INDICATION OF MEASURE OF FOCUS AS A FUNCTION OF FOCAL DISTANCE

(75) Inventors: Andrew C. Goris, Loveland, CO (US); Jason E. Yost, Windsor, CO (US); Gregory V. Hofer, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 348 days.

(21) Appl. No.: 10/356,079

(22) Filed: Jan. 31, 2003

(65) Prior Publication Data

US 2004/0151486 A1    Aug. 5, 2004

(51) Int. Cl.
G03B 13/34    (2006.01)
G03B 17/18    (2006.01)

(52) U.S. Cl. ..................................... 396/121; 396/281

(58) Field of Classification Search ............... 396/121, 396/281, 287, 290
See application file for complete search history.

(56) References Cited

U.S. PATENT DOCUMENTS

| | | | | |
|---|---|---|---|---|
| 5,521,671 A | * | 5/1996 | Aoki et al. | 396/281 |
| 5,687,409 A | * | 11/1997 | Miyamoto | 396/290 |
| 5,794,086 A | * | 8/1998 | Wakabayashi et al. | 396/284 |
| 2002/0025161 A1 | * | 2/2002 | Seki et al. | 396/287 |

* cited by examiner

Primary Examiner—C. Mahoney

(57) ABSTRACT

A camera includes software to compute a measure of focus at a plurality of focal distances. The camera includes an indicator of the measure of focus as a function of focal distance. The camera may also include an indication of present focal position. The camera may also include an indication of present depth of field.

13 Claims, 4 Drawing Sheets

CAMERA WITH INDICATION OF MEASURE OF FOCUS AS A FUNCTION OF FOCAL DISTANCE

FIELD OF INVENTION

This invention relates generally to cameras and more specifically to camera focusing.

BACKGROUND

Cameras with fully automatic focusing commonly analyze a digital image from a photosensor array and adjust the focal distance of a lens until image edge contrast is maximized. There are several circumstances under which image edge contrast maximization may not provide a suitably focused image. In addition, a camera operator may choose to manually focus a camera. There is a need for improved operator control of focus.

SUMMARY

A camera computes and indicates to a camera operator a measure of focus as a function of focal distance.

DETAILED DESCRIPTION OF EXAMPLE EMBODIMENTS

Figure 1:
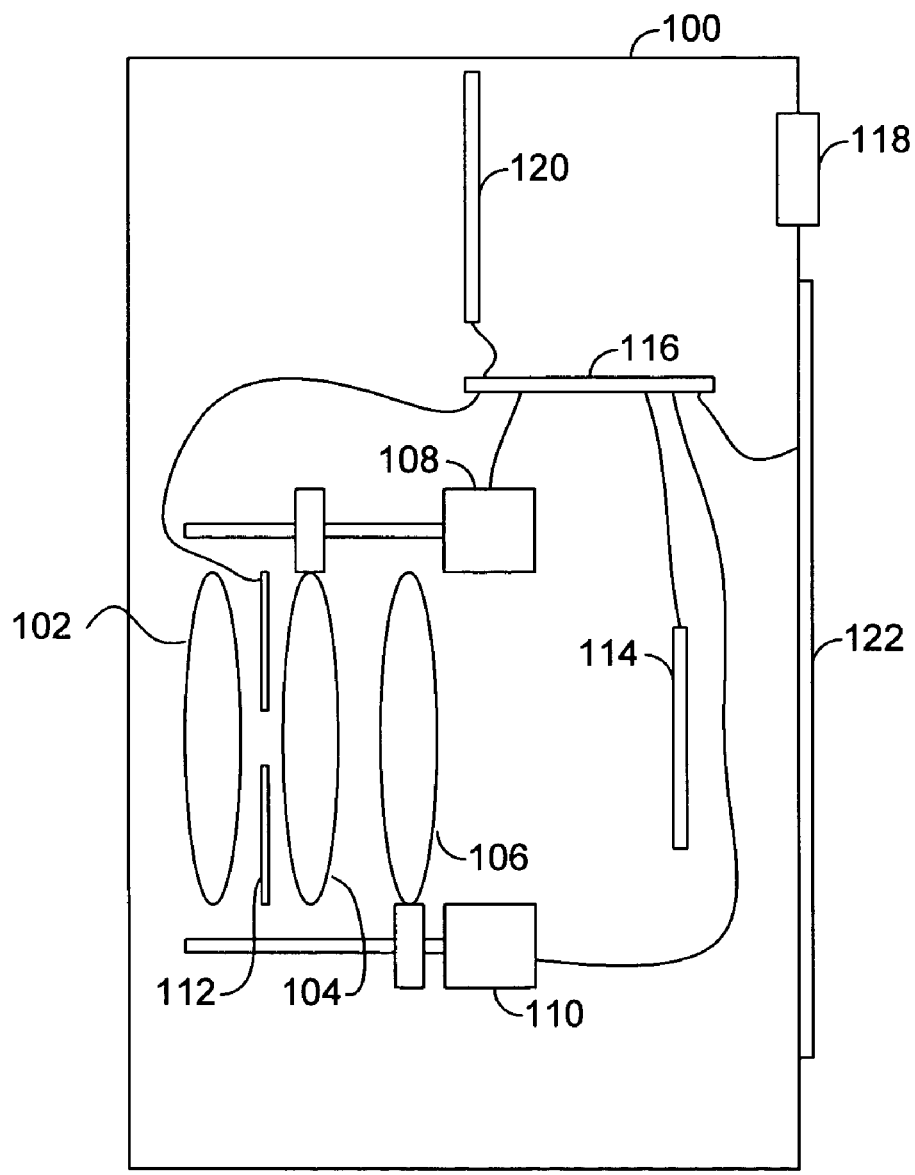
FIG. 1 is a block diagram side view of an example embodiment of a camera in which example embodiments of the invention may be implemented.

FIG. 1 illustrates an example camera with automatic focus. The invention is not limited to fully automatic focus cameras, but the invention is particularly useful for providing additional information in conjunction with automatic focus. In FIG. 1, a camera 100 includes an example lens system that has a stationary group of elements 102, a first moveable group of elements 104, a second moveable group of elements 106. The number of moveable and stationary groups of elements is arbitrary and is for illustration only. Other suitable lens designs may have only one moving group of elements, or more than two moving groups of elements, or all groups of elements may move. In the example of FIG. 1, a first motor 108 drives a lead screw, which is attached to a follower nut attached to the first moveable group of elements 104. A second motor 110 drives a lead screw, which is attached to a follower nut attached to the second moveable group of elements 106. The moveable groups of elements are moved independently to provide both zoom and focus.

Camera 100 also includes a shutter/aperture 112 with variable aperture. The variable aperture may be part of the lens system, but may be separate. The variable aperture may be mechanical or electronic. A photosensor array 114 is used for focus control and to measure the brightness of light from a scene. In a digital camera, the photosensor array 114 may also be used as the imaging array. A processor/controller 116 receives images or light intensity data from the photosensor array and controls the lens system and the variable aperture. The lens system may have continuously variable focus. Alternatively, the lens system may have multiple discrete focus settings, which may be numbered, with each setting providing a predetermined focal distance.

The camera optionally may have an optical viewfinder 118, and may optionally have an internal display 120, controlled by processor 116, viewable through the viewfinder 118. As an alternative to the optical viewfinder 118, or in addition to the optical viewfinder, the camera may have an external display 122, controlled by the processor 116. Display 120 or 122 may comprise a few light sources, such as LED's, or display 120 or 122 may comprise controllable segments, or display 120 or 122 may comprise graphic displays. Display 120 or 122 may optionally include indicators for light level, battery charge, exposure number, and so forth. The position of display 122 may optionally be variable relative to the camera body to permit viewing at variable angles.

Algorithms for computing a measure of focus are well known in the art. For example, the following articles survey multiple techniques: G. Ligthart and F. Groen, "A Comparison of Different Autofocus Algorithms", *Proc. IEEE International Conference on Pattern Recognition*, pp. 597–600, 1982: E. Krotkov, "Focusing", *International Journal of Computer Vision*, Vol. 1, pp 223–237, 1987: M. Subbarao and T Choi, "Focusing Techniques", *SPIE*, Vol. 1823, pp 163–174, 1992: J. Lee, et al., "Implementation of a Passive Automatic Focusing Algorithm for Digital Still Camera", *IEEE Transactions on Consumer Electronics*, Vol 41, No. 3, pp. 449–454, 1995.

If a camera lens system is focused so that the focal distance is less than infinity, then objects at distances closer to the camera than the focal distance have some blur, and objects at distances farther away than the focal distance have some blur. For any camera lens system, and imaging or viewing technology, there exists an acceptable blur that is sufficiently small that it does not adversely affect the resolution of the overall system, or is imperceptible to the average human eye. The acceptable blur is typically specified as the diameter of a circle on the film plane or photosensor array plane, and is called blur diameter (also called Circle of Confusion). There are numerous physical limitations that may indirectly impose an acceptable blur diameter at the film plane or photosensor array plane. For example, for film, a blur smaller than a silver grain in the film emulsion will not be noticeable. For photosensor arrays, a blur smaller than the pitch of individual photosensors will not be noticeable. For digital displays, a blur smaller than the pitch of individual display elements will not be noticeable. Alternatively, acceptable blur may be defined in terms of the average human eye, for example, the ability to resolve lines at a particular spacing when viewed from a particular distance. For a camera lens system, with a focal distance that is less than infinity, and a specified acceptable blur diameter, there is a distance nearer to the camera than the focal distance, at which blur exceeds the specified acceptable blur diameter, and a far point farther away from the camera than the focal distance, at which blur exceeds the specified acceptable blur diameter. The difference between the far point and the near point is the depth of field, and the blur for objects within the depth of field is less than the specified acceptable blur diameter.

Figure 2A:
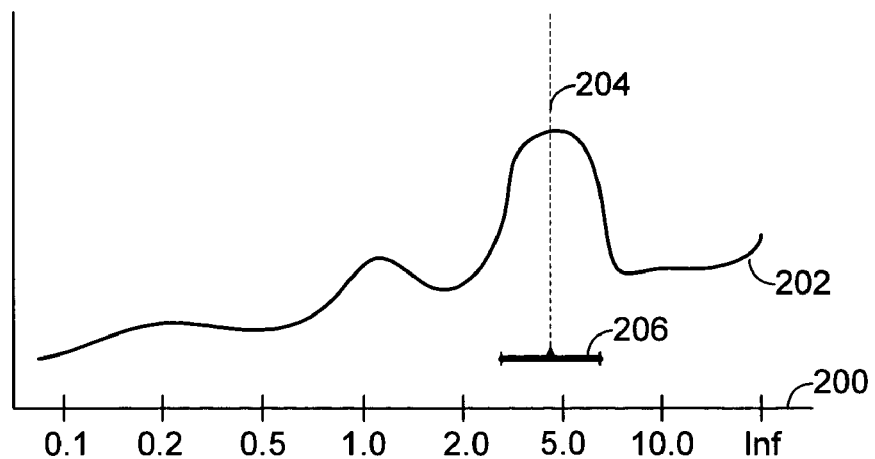
FIGS. 2A–2C are alternative example embodiments of an indication of a measure of focus as a function of focal distance.

FIG. 2A illustrates an example embodiment of a graphical display of a measure of focus as a function of focal distance. A horizontal axis 200 indicates focal distance, for example, meters on a logarithmic scale. A curve 202 indicates a dimensionless measure of focus, where increasing vertical height indicates improved focus as measured by the measure of focus, as a function of focal distance. An optional vertical line 204 provides an indication of the focal distance at which the lens is presently set. An optional horizontal line 206 indicates the depth of field for the present lens focal length and aperture.

Figure 2B:
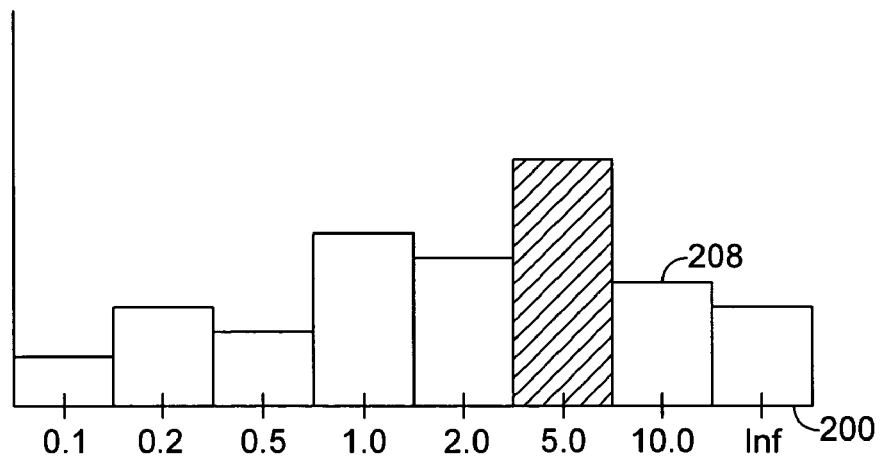

FIG. 2B illustrates an alternative example embodiment of a display of a measure of focus as function of focal distance. In FIG. 2B, vertical bars 208 provide a measure of focus at discrete focal distances. One bar may indicate the approximate focal distance at which the lens is presently set by a distinctive color, pattern, or intensity.

Figure 2C:
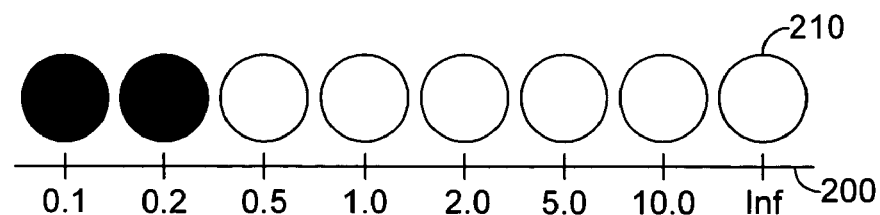

FIG. 2C illustrates another alternative example embodiment of a display of a measure of focus as a function of focal distance. In FIG. 2C, discrete lights 210 provide a measure of focus at each discrete band of focal distance, where the measure of focus may be indicated, for example, by color or intensity.

If the focus indication is on display 122, and if display 122 provides a real-time display of what is being imaged by a photosensor array, then the camera operator can use display 122 to frame the shot and see the focus information simultaneously. If there is a viewfinder 118, the indicator in display 120 may be in the periphery of the viewfinder, and the operator can use the viewfinder to frame the shot and see the focus information in display 120 simultaneously.

Figure 3:
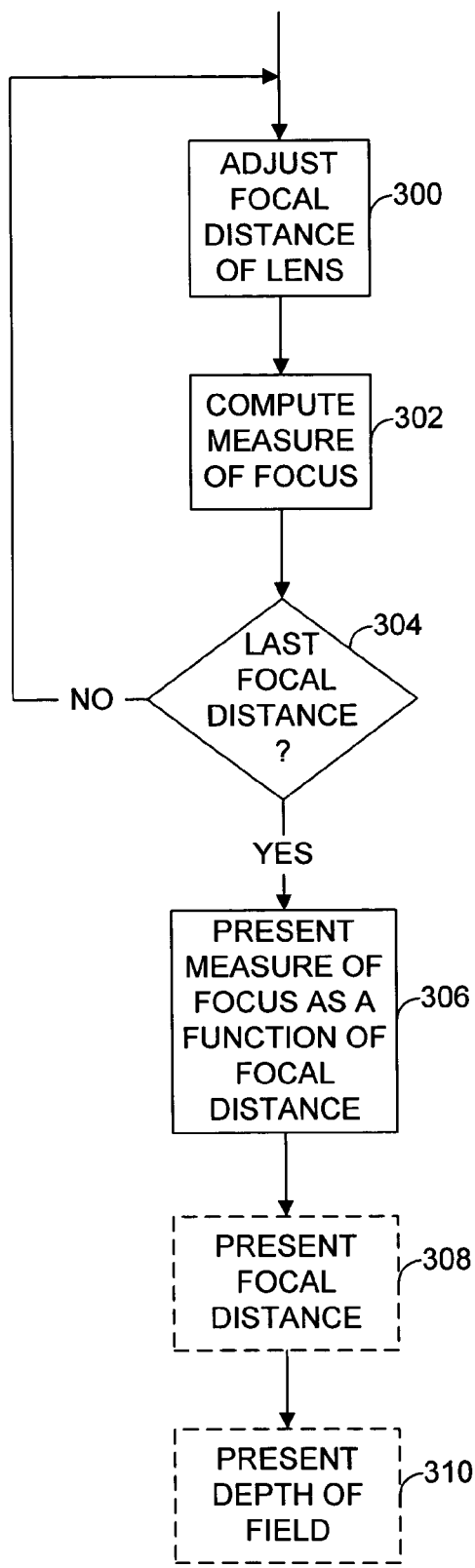
FIG. 3 is a flow chart of an example embodiment of a method to provide an indication of a measure of focus as a function of focal distance.

FIG. 3 illustrates an example of a method in accordance with the invention. At step 300, a camera adjusts the focal distance for a lens. At step 302, the camera computes a measure of focus. At step 304, if more focal distances are needed then steps 300 and 302 are repeated at a different focal distance. At step 304, if a measure of focus has been computed for each focal distance of interest then at step 306 the camera computes and indicates a measure of focus as a function of focal distance. Optionally, at step 308 the camera display may indicate the present focal distance. Optionally, at step 310, the camera display may indicate depth of field.

A camera operator can use the focus information illustrated in FIGS. 2A–2C to make adjustments before taking a picture. For example, the focus information may indicate multiple peaks, and the operator may use the focus information to determine which peak the camera is using for automatic focus. For example, if a person is standing in front of a object, the operator may determine from the focus information that the camera is focusing on the object and not the person. Alternatively, if the display includes depth of field, the operator can observe the depth of field, and decide to increase the aperture (reducing the depth of field) so that a background is less in focus, or decrease the aperture (increasing the depth of field) to include additional objects in the depth of field.

Figure 4:
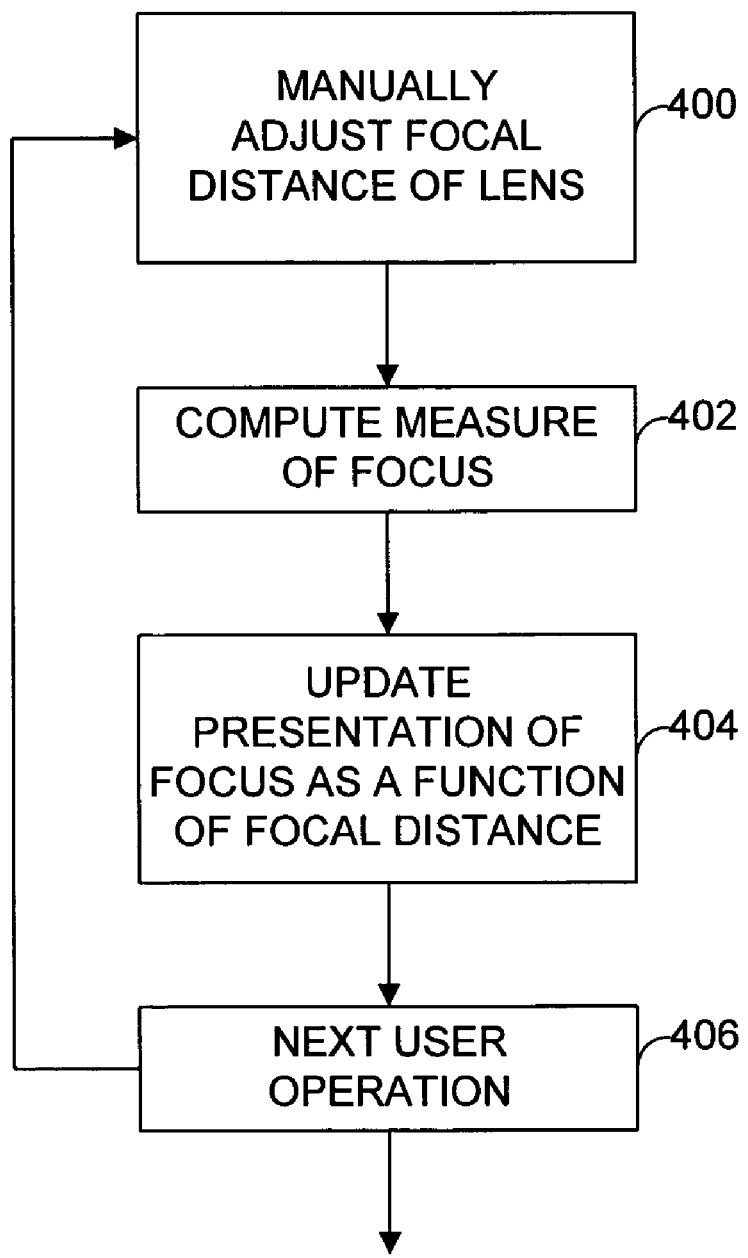
FIG. 4 is a flow chart of an example embodiment of a method to provide an indication of a measure of focus as a function of focal distance as an aid for manual focus.

Alternatively, the camera operator may choose to manually control focus, and use the display as a manual focusing aid. In FIG. 4, an operator manually adjusts the focal distance of a lens (step 400). Manual focus may be performed, for example, through use of buttons, a thumb dial, or a lens ring. At step 402, the camera computes a measure of focus. At step 404, the camera updates a presentation of focus as a function of focal distance. Note that this may be a partial display, since not all focal distances may have been measured. In manual focus mode, if the operator does not manually focus over all focal distances, then the camera may never display a measure of focus over all focal distances. At step 406, the operator may further adjust focus (return to step 400), or the operator may go on to other operations.

The display may also indicate a failure of automatic focus. For example, contrast may be so low that the camera has defaulted to a focal distance at infinity, or for example, the camera may be too close to an object and a macro mode may be needed. Automatic focus may also fail if illumination is too low, so that an operator may need to manually focus in conjunction with use of a strobe.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A camera comprising:
    a lens with adjustable focal distance;
    a photosensor array, receiving an image through the lens and generating image data for a plurality of focal distances;
    a processor receiving the image data from the photosensor array and computing a measure of focus, using the image data, at each of the plurality of focal distances; and
    an indicator, controlled by the processor, indicating the measure of focus as a function of focal distance.

2. The camera of claim 1, further comprising:
    the indicator indicating a focal distance within the plurality of focus distances at which the lens is presently adjusted.

3. The camera of claim 1, further comprising:
    the indicator indicating a depth of field.

4. The camera of claim 1, the indicator further comprising at least one light.

5. The camera of claim 1, the indicator further comprising a graphic display.

6. The camera of claim 1, further comprising:
    an optical viewfinder; and
    the indicator visible through the optical viewfinder.

7. The camera of claim 1, the indicator positioned externally to a body of the camera.

8. A method, comprising:
    computing, by a processor in a camera, a measure of focus at a plurality of focal distances; and
    indicating, by the camera, in a manner detectable by a human operator of the camera, the measure of focus as a function of focal distance.

9. The method of claim 8, further comprising:
    indicating, by the camera, present focal distance.

10. The method of claim 8, further comprising:
    indicating, by the camera, present depth of field.

11. A camera, comprising:
    means for computing, by the camera, a measure of focus at a plurality of focal distances; and
    means for indicating, by the camera, to a human operator of the camera, the measure of focus as a function of focal distance.

12. The camera of claim 11, further comprising:
    means for indicating, to the human operator, present focal distance.

13. The camera of claim 11, further comprising:
    means for indicating, to the human operator, present depth of field.

* * * * *